March 19, 1957  H. J. HORN  2,785,777
VEHICLE WHEEL COVER PLATE
Filed Sept. 25, 1951  2 Sheets-Sheet 1
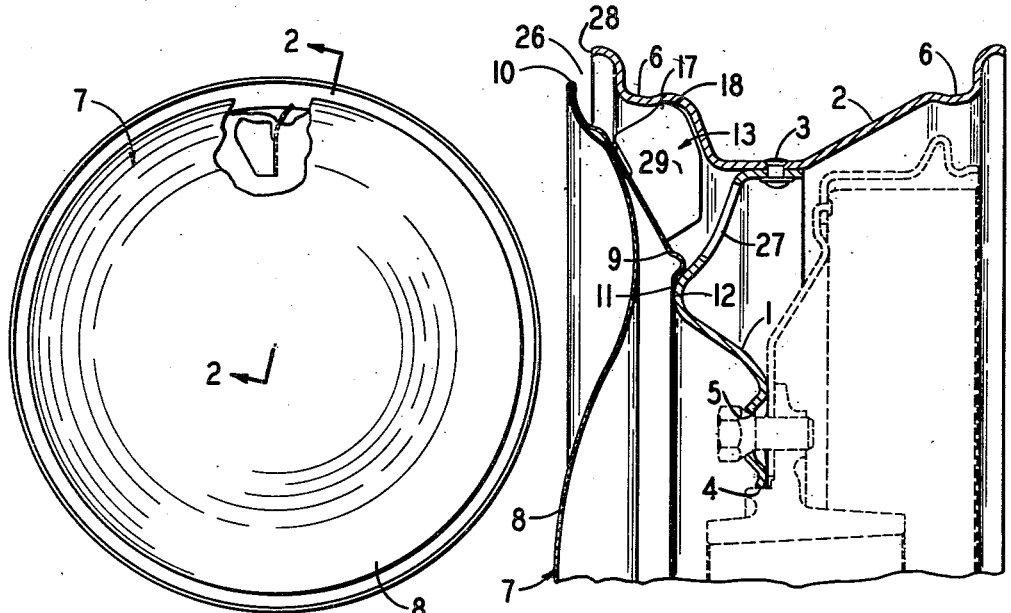
FIG. 1
FIG. 2
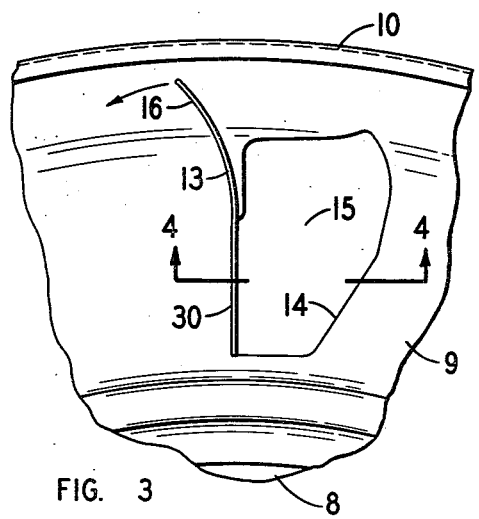
FIG. 3
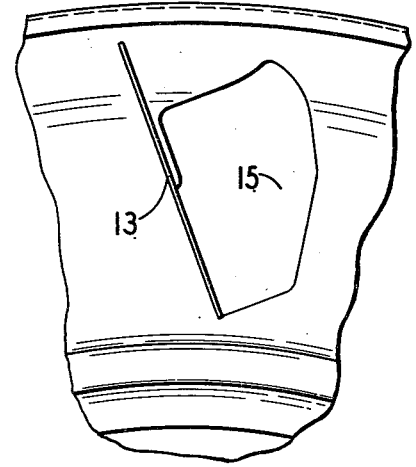
FIG. 5
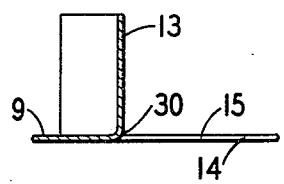
FIG. 4
*INVENTOR.*
HARRY J. HORN
BY
Barnes, Kisselle, Laughlin & Raisch
ATTORNEYS

*INVENTOR.*
HARRY J. HORN

United States Patent Office 2,785,777
Patented Mar. 19, 1957

2,785,777

VEHICLE WHEEL COVER PLATE

Harry J. Horn, Lansing, Mich., assignor to Motor Wheel Corporation, Lansing, Mich., a corporation of Michigan Application September 25, 1951, Serial No. 248,213

6 Claims. (Cl. 188—264)

This invention relates to a vehicle wheel cover plate.

It is an object of this invention to produce an improved vehicle wheel cover plate which is simple, easily assembled to, and disassembled from, the wheel and which securely attaches to the wheel.

The invention also contemplates a cover plate for a vehicle wheel which serves as a fan for circulating air over the brake drum to cool the same.

Fig. 1 is a front elevation of the wheel with the cover attached, a small portion of the cover being broken away to show one of the attaching members.

Fig. 2 is a section along the line 2—2 of Fig. 1.

Fig. 3 is a back view of a portion of the cover removed from the wheel.

Fig. 4 is a section along the line 4—4 of Fig. 3.

Fig. 5 is a view similar to Fig. 3 of a modified form of attaching member.

Figure 6:
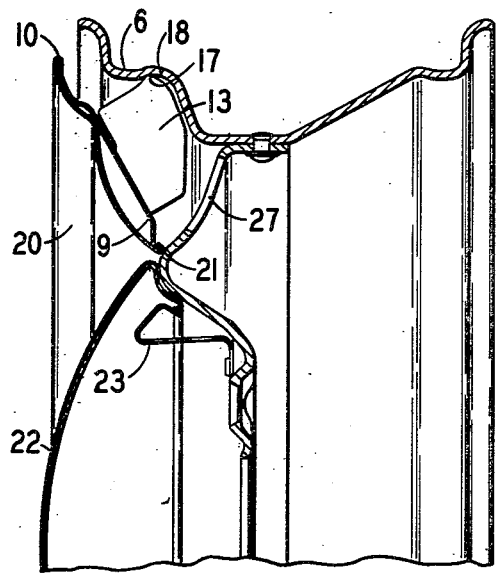
Fig. 6 is a vertical sectional view showing a modified cover in the form of an annular ring and mounted on a safety type rim.

Referring more particularly to the drawings there is shown a wheel comprising a wheel body 1 and a rim 2. The rim 2 is secured to the body 1 in a conventional manner as, for example, by rivets 3. The wheel body 1 is provided with a central opening 4 and a plurality of circumferentially spaced holes 5 for the reception of bolts or cap screws for demountably attaching the wheel to a hub.

Referring to Figs. 1, 2 and 3, the rim 2 is provided with tire bead seats 6. In the form of wheel shown in Figs. 1–6, 8 and 9, a circumferential bead 18 is formed in each tire bead seat adjacent the inner side or toe of the bead. This is a conventional form of rim and the bead 18 tends to keep the tire bead from sliding down into the gutter of the rim when the tire is deflated. The cover plate is designated 7 and in this form of the invention covers substantially the entire front face of the wheel within the outer circumferential edge 28 of the rim. Cover 7 can be made from any suitable resilient material such as sheet metal or plastic but preferably is made of sheet steel. Cover 7 comprises a front portion 8 and a back portion 9. By way of illustration, front portion 8 and back portion 9 are separate parts which are held together by rolling the outer circumferential edge 10 of front part 8 over the outer circumferential edge of back part 9. Back part 9 takes the form of a conical ring, the inner circumferential edge portion 11 of which contacts the wheel body 1 along a generally circular area designated 12.

For securing the cover on the wheel, the back portion 9 is provided with a plurality of spring fingers or blades 13. Fingers 13 are spaced circumferentially about the back portion 9 and each finger 13 is formed by shearing back 9 along shear line 14 and forms opening 15 when finger 13 is bent upwardly at substantially a right angle to the face or plane of back portion 9. The junction between the blade 13 and back 9 is designated 30. In the form shown in Fig. 3 the radially outer portion of finger 13 beyond junction 30 is curved as at 16.

In the form shown in Fig. 5, finger 13 is sheared out at a slight angle to a radius of cover 7 and is left straight rather than curved as in the form shown in Fig. 6. Fingers 13 are flexible or resilient in a circumferential direction as indicated by the arrow, Fig. 3, but substantially rigid in a radial direction. The flexible or resilient spring fingers 13 which contact the rim and hold the cover in place are positioned substantially parallel to the axis of the wheel and substantially perpendicular to a plane parallel with the front of the wheel, that is, a plane perpendicular to the axis of the wheel. When the cover 7 is mounted on a wheel, it is simply pressed in an axial direction or to the right, Fig. 2, and fingers 13, upon contacting the inner side of the tire bead seat 6, flex or yield circumferentially in response to radially directed thrust and allow the cover to be pushed to its final position, Figs. 1 and 2. In its final position the radially outer corners 17 of fingers 13 engage behind the tire bead seat 6. Thus, it is the edge rather than the faces 29 of the blades 13 which contact and interengage the wheel rim. The number of spring fingers 13 can be varied. Three or more of these fingers 13 can be used, but preferably eight fingers are used for retaining a cover 7 on the wheel and these fingers 13 are preferably equispaced circumferentially about the cover. It will be noted that the tip 17 of each finger 13 is rounded slightly since it fits into the groove, i. e., the inner face of bead 18, on the inner face of the rim in back of the tire bead seat 6.

The cover can be easily removed by prying the cover away from the wheel with a screw driver or similar instrument.

Figure 7:
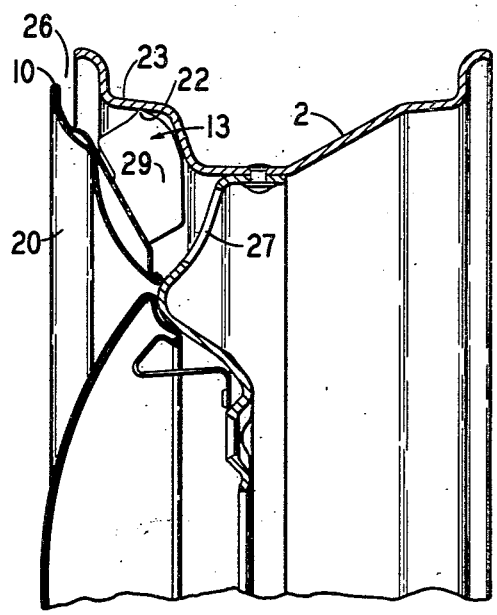
Fig. 7 shows the same modified form of cover as Fig. 6 but with the cover mounted on a conventional type rim.

In the modified form shown in Figs. 6 and 7 the front part 20 of the cover is in the form of an annular ring rather than in the form of a disk which covers the entire front face of the wheel. As in the case of front cover part 8, Figs. 1 to 3, front cover part 20 is turned over the back portion 9 of the cover along both its outer and inner edges as at 10 and 21. Here again fingers 13 are sheared and then bent out of back portion 9 as in the principal form of the invention. The central hub portion of the wheel is covered by a conventional hub cap 22 which is retained in place by clips 23 in a known manner.

In Fig. 7 the cover plate is identical with that shown in Fig. 6 except that the radially outer tip 22 of each finger 13 is sharp where it contacts in back of the flat tire bead seat 23. The rim 2, shown in Fig. 7, is a conventional or regular rim which has a flat tire bead seat 23 and the bead 18 as in tire bead seat 6 of Fig. 6 is omitted.

Figure 8:
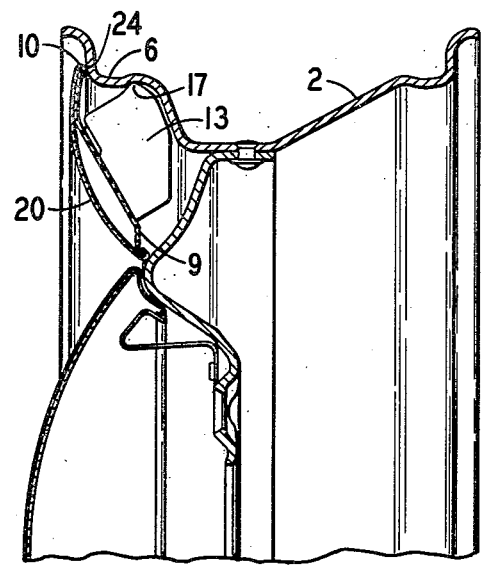
Fig. 8 is a vertical section showing a modified form of trim ring cover plate mounted on a wheel with the plate in contact with the rim.

In Fig. 8 the cover is the same as that shown in Fig. 6 except that the cover is formed so that the outer circumferential edge portion 10 of the cover contacts the rim as at 24.

Figure 9:
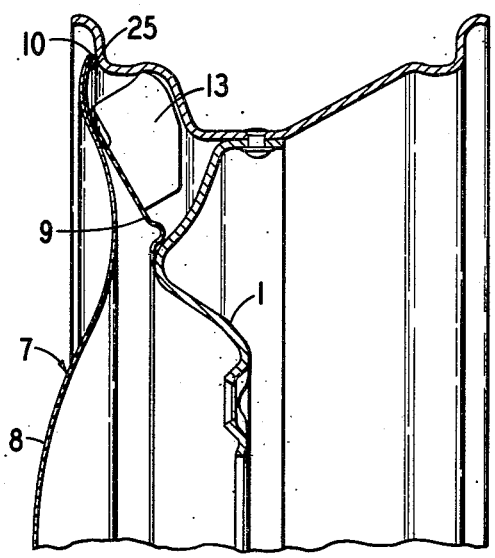
Fig. 9 is a vertical sectional view showing a modified form of full wheel cover with the cover in contact with the rim.

The form of wheel cover shown in Fig. 9 is identical with that shown in Figs. 1 to 3 except that the cover is designed so that the outer circumferential edge 10 contacts the rim as at 25. In Fig. 9 the cover 7 covers the entire front face of the wheel.

The form of tire cover shown in Figs. 8 and 9 where the outer circumferential edge of the cover contacts the wheel rim is not as well adapted for ventilation or cooling of the brake drum as is the form of invention shown in Figs. 1 through 7 where there is a gap 26 between the cover 7 and the rim 2. In the form shown in Figs. 1 thorough 7, fingers 13 are the only portion of the cover assembly which contact the rim 2 and the wheel body is provided with a plurality of circumferentially spaced vent openings 27. Openings 27 are positioned between the inner circumferential edge of cover portion 9 and the outer circumferential edge of the wheel body 1. The brake drum and hub for each wheel are not shown in all the drawings, but the brake drum will be mounted on the back face of the wheel hub in a conventional and known manner as indicated in Fig. 2 by dotted lines.

In both forms of the wheel cover fingers 13 operate as blades or vanes of a fan and produce a circulation of air. These fingers or vanes 13, as long as the wheel is rotating, cause the air to flow from the back or right hand side of the wheel, as viewed in Figs. 2, 6 and 7, through the openings 27 in the wheel body, past the fingers 13 through the gap 26 between the cover and the rim 2, and finally out through the opening between the outer edge 10 of the cover and the edge 8 of the rim. This circulation or flow of air aids substantially in maintaining the brake drum cool. It is essential both from an operating standpoint and from an appearance standpoint that the openings 15 in the back portion 9 do not show when the cover is mounted on the wheel. Therefore, front portions 8 and 20 preferably are imperforate so that fingers 13 are boxed in between the rim and the front portions 8 and 20. The fingers 13 get their efficiency as an air moving structure due to the fact that they are boxed in, thus requiring the air to be drawn over the brake drum through openings 27 and forced out between the rim 2 and cover 7.

In the form shown in Figs. 8 and 9, the fingers 13 will cause some circulation of air but unless the wheel body 1 in this form of the invention is provided with ventilating openings, the vanes 13 will not cause any circulation of air about the brake drum which will be positioned on the opposite side of the wheel body 1. Where ventilation is desired, then preferably twelve or sixteen fingers 13 will be used with each cover.

What is claimed is:

1. A vehicle wheel cover for use with a wheel having a rim provided with a generally axially extending inner annular face, said cover having a generally ornamental front face and a rear face adapted to be positioned adjacent the outer face of the wheel, a plurality of spaced resilient blades fixedly positioned on said rear face of said cover, said blades extending in a generally radial direction and having their radially outermost ends flexible and distortable in a direction circumferentially of the cover in response to radially inward compression, said blades being disposed in planes substantially perpendicular to the plane of the cover and said radially outer ends being adapted to interengage said inner annular face of the wheel rim to secure the cover to the wheel.

2. A vehicle wheel cover for use with a wheel having a rim provided with a generally axially extending inner annular face, said cover having a generally ornamental front face and a rear face adapted to be positioned adjacent the outer face of the wheel, a plurality of spaced resilient blades fixedly positioned on said rear face of said cover, said blades extending generally radially of said cover and being positioned in planes substantially perpendicular to the plane of said cover, said blades being connected with the rear face of said cover along generally radially extending lines, each blade having an end portion which extends radially outwardly beyond the junction between the blade and the cover, said end portions being flexible and distortable in a direction circumferentially of the cover in response to radially inward compression, said end portions being adapted to interengage said inner annular face of the wheel rim to secure the cover to the wheel.

3. The cover defined in claim 2 wherein said radially outer end portions are shaped as corners for interengagement with said inner annular face of said rim.

4. The cover defined in claim 2 wherein each blade is integral with the cover and formed by shearing the cover along a line identical with the peripheral contour of the blade and bending the sheared portion along a generally radial line to a position substantially at right angles to the face of the cover.

5. In combination a vehicle wheel including a wheel body and rim, said wheel body having a plurality of circumferentially spaced openings therein and said wheel rim having an inner annular surface which extends in a direction generally axially of the wheel, a cover for said wheel having a front ornamental face and a rear face which is adapted to be positioned adjacent the outer face of the wheel body, a plurality of spaced resilient blades fixedly positioned on said rear face of said cover, said blades extending in a generally radial direction and having their radially outermost ends flexible and distortable in a direction circumferentially of the cover in response to radially inward compression, said blades being disposed in planes substantially perpendicular to the plane of the cover, at least three of said blades interengaging the inner face of said rim with said ends thereof held in radial compression and in circumferentially flexed position by said generally axially extending surface of said rim to secure said cover to said wheel and to hold said cover in axially spaced relation with said rim and wheel body whereby during rotation of the wheel the blades cause air to circulate from the back side of said wheel forwardly through said openings and the gap between said cover and wheel rim.

6. In a vehicle wheel structure including a multi-flanged tire rim, a cover for the outer side of the wheel including fin-like retaining elements therebehind having generally radially extending body portions with generally radially elongated margins connected to the cover and radially outer generally axially extending free edges having axially inner parts thereof projecting radially outwardly substantially beyond adjacent axially outer parts of said edges for retainingly engaging with a flange of the tire rim.

References Cited in the file of this patent

UNITED STATES PATENTS

| | | |
|---|---|---|
| 550,723 | Morgan | Dec. 3, 1895 |
| 2,092,975 | Hunt et al. | Sept. 14, 1937 |
| 2,143,950 | Kliesrath | Jan. 17, 1939 |
| 2,148,211 | Lyon | Feb. 21, 1939 |
| 2,368,228 | Lyon | Jan. 30, 1945 |
| 2,368,238 | Lyon | Jan. 30, 1945 |
| 2,433,854 | Lyon | Jan. 6, 1948 |
| 2,600,410 | Lyon | June 17, 1952 |
| 2,633,944 | Butterfield | Apr. 7, 1953 |

FOREIGN PATENTS

| | | |
|---|---|---|
| 682,948 | France | June 4, 1930 |
| 787,597 | France | Sept. 25, 1935 |

OTHER REFERENCES

Chrysler, page 14, vol. 21, No. 5, Brake Service, May 1951.